(12) United States Patent
Senba et al.

(10) Patent No.: US 6,614,998 B1
(45) Date of Patent: Sep. 2, 2003

(54) AUTOMATIC FOCUSING CAMERA AND SHOOTING METHOD

(75) Inventors: Takehiko Senba, Asaka (JP); Atsushi Misawa, Asaka (JP); Akihisa Yamazaki, Asaka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 30 days.

(21) Appl. No.: 09/690,741

(22) Filed: Oct. 18, 2000

(30) Foreign Application Priority Data

Oct. 18, 1999 (JP) .......................... 11-295672
Oct. 18, 1999 (JP) .......................... 11-295673

(51) Int. Cl.$^7$ .......................... G03B 3/10; G03B 13/34
(52) U.S. Cl. .......................... 396/123; 396/77
(58) Field of Search .......................... 396/89, 121, 122, 396/123, 124, 125, 77, 79, 80

(56) References Cited

U.S. PATENT DOCUMENTS

| | | | | |
|---|---|---|---|---|
| 4,829,331 A | * | 5/1989 | Aihara | 396/121 |
| 4,933,700 A | * | 6/1990 | Ikeda et al. | 396/123 |
| 5,313,245 A | * | 5/1994 | Konishi | 396/109 |
| 6,430,368 B1 | * | 8/2002 | Hata | 396/79 |

FOREIGN PATENT DOCUMENTS

| JP | 6289279 | 10/1994 |
|---|---|---|
| JP | 6313839 | 11/1994 |

* cited by examiner

*Primary Examiner*—Russell Adams
*Assistant Examiner*—Arthur A Smith
(74) *Attorney, Agent, or Firm*—Birch, Stewart, Kolasch & Birch, LLP

(57) ABSTRACT

An automatic focusing camera is provided with a determining device that determines a plurality of positions of a lens group or an imaging surface of a CCD for focusing on a plurality of subjects in a subject image, an AF motor that sequentially moves the lens group or the imaging surface of the CCD to the determined positions, and a shooting device that performs shootings when the lens group or the imaging surface of the CCD is at the positions.

9 Claims, 7 Drawing Sheets

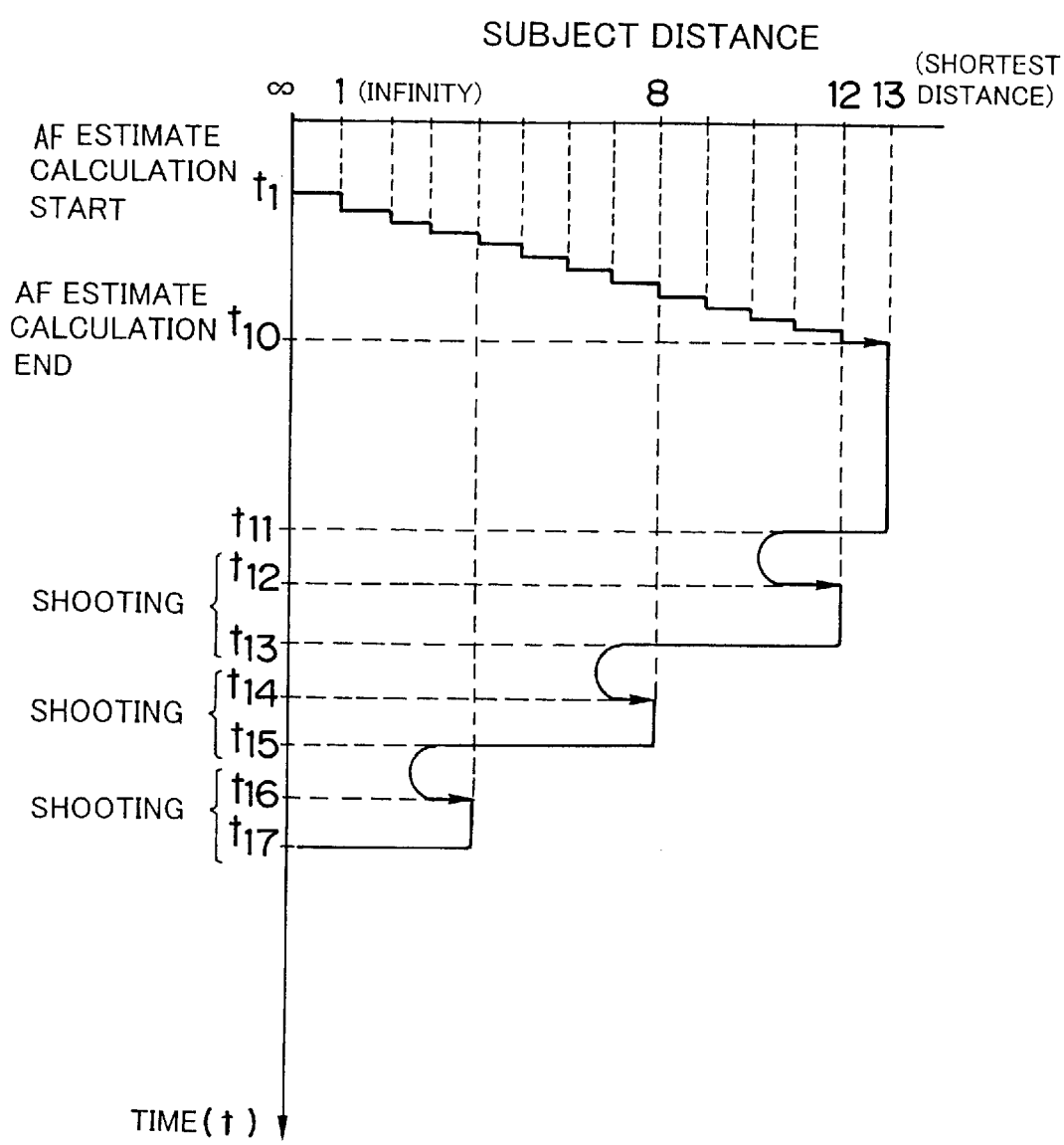
F I G. 6

F I G. 7
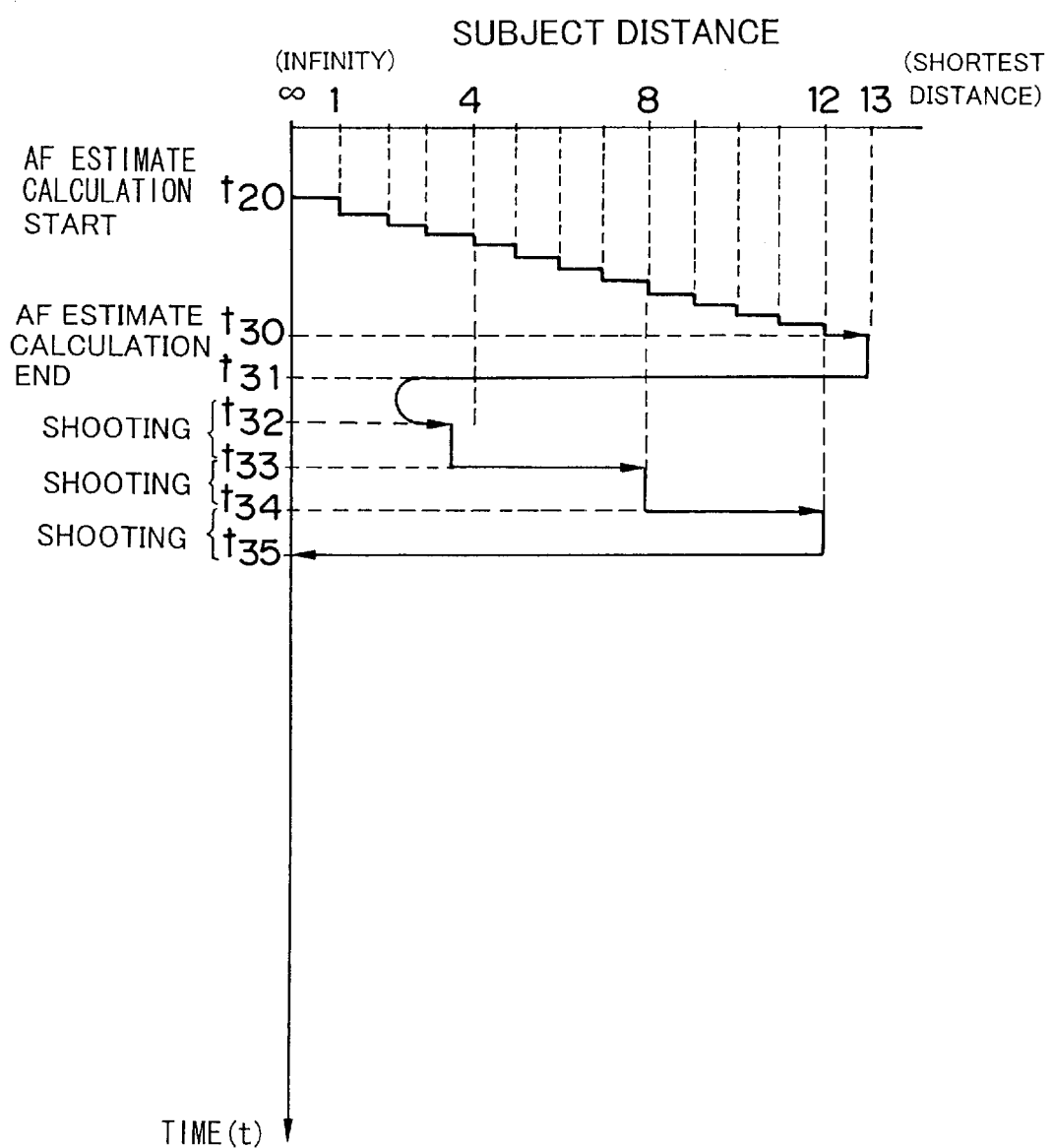

AUTOMATIC FOCUSING CAMERA AND SHOOTING METHOD

BACKGROUND OF THE INVENTION

1. Field of the Invention

The present invention relates generally to an automatic focusing camera and a shooting method, and more particularly to an automatic focusing camera and a shooting method in which a plurality of subjects are focused for the shot.

2. Description of Related Art

Japanese Patent Provisional Publication No. 6-313839 discloses a camera that provides multiple small focusing areas and determines the best point where there is a main subject to focus on the main subject. Japanese Patent Provisional Publication No. 6-289279 discloses a camera that determines a line of sight of a user and provides a focusing area on the line of sight.

However, the camera disclosed in Japanese Patent Provisional Publication No. 6-313839 does not always focus on a subject the user intends.

It is difficult for the camera disclosed in Japanese Patent Provisional Publication No. 6-289279 to determine the line of sight when the user wears glasses, and the camera does not focus on an intended subject.

In these types of cameras, the subject distances the cameras determine are often different from the user-intended subject distances. This easily happens when the user-intended subject is small and a large subject is positioned before or after the subject, for example, when the user intends to focus on a person with a mountain for the background.

SUMMARY OF THE INVENTION

In view of the foregoing, it is an object of the present invention to provide an automatic focusing camera and a shooting method that can focus on a subject a user intends even if there are subjects with different subject distances.

To achieve the above-mentioned object, the present invention is directed to an automatic focusing camera, comprising: a determining device that determines a plurality of positions of one of a focus lens and an imaging surface for focusing on a plurality of subjects in a subject image; a focus adjusting device that sequentially moves the one of the focus lens and the imaging surface to each of the positions determined by the determining device; and a shooting device that performs shootings when the one of the focus lens and the imaging surface is at each of the positions.

According to the present invention, the automatic focusing camera comprises the determining device that determines the positions of the focus lens or the imaging surface for focusing on the subjects in the subject image, the focus adjusting device that sequentially moves the focus lens or the imaging surface to the positions determined by the determining device, and the shooting device that performs the shootings when the focus lens or the imaging surface is at the positions. Therefore, the user can focus the camera on the intended subjects even if there are subjects with different subject distances.

To achieve the above-mentioned object, the present invention is directed to an automatic focusing camera, comprising: a determining device that determines a plurality of positions of one of a focus lens and an imaging surface for focusing on a plurality of subjects in a subject image; a focus adjusting device that moves the one of the focus lens and the imaging surface to a position that is substantially halfway between both ends of the positions determined by the determining device; an aperture adjusting device that adjusts an aperture so that the subjects are within a depth of field when the subjects are imaged with the one of the focus lens and the imaging surface moved by the focus adjusting device; and a shooting device that performs a shooting with the one of the focus lens and the imaging surface moved by the focus adjusting device and the aperture adjusted by the aperture adjusting device.

According to the present invention, the automatic focusing camera comprises the determining device that determines the positions of the focus lens or the imaging surface for focusing on the subjects in the subject image, the focus adjusting device that moves the focus lens or the imaging surface to the position that is substantially halfway between both ends of the positions determined by the determining device, the aperture adjusting device that adjusts the aperture so that the subjects are within the depth of field when the subjects are imaged with the focus lens or the imaging surface moved by the focus adjusting device, and the shooting device that performs the shooting with the focus lens or the imaging surface moved by the focus adjusting device and the aperture adjusted by the aperture adjusting device. Therefore, the user can focus the camera on the intended subject even if there are subjects with different subject distances.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 6 is a timing chart showing a shooting method according to the present invention; and FIG. 7 is a timing chart showing a shooting method according to the present invention.

DETAILED DESCRIPTION OF THE PREFERRED EMBODIMENT

This invention will be described in further detail by way of example with reference to the accompanying drawings.

Figure 1:
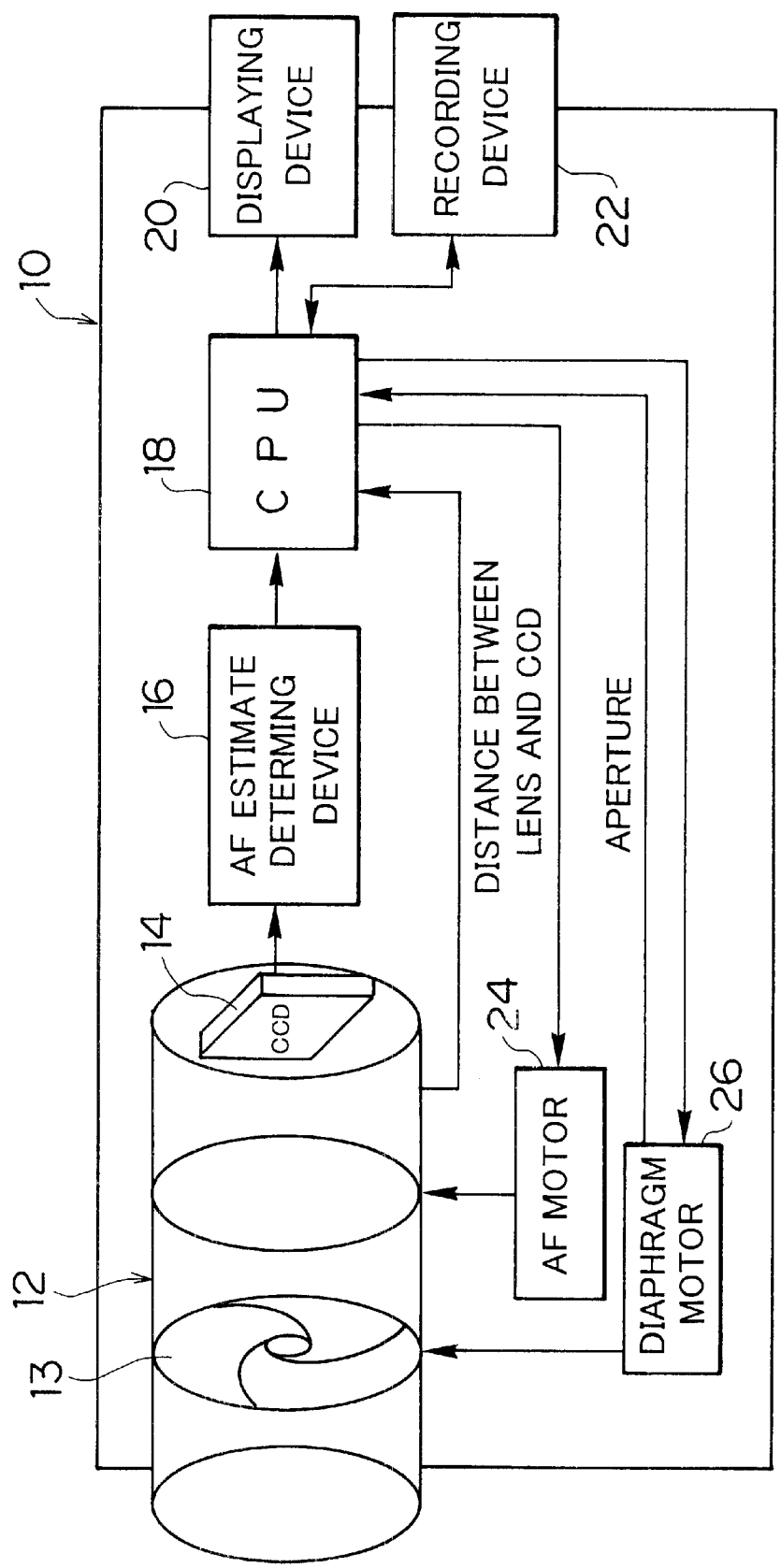
FIG. 1 is a block diagram showing an embodiment of an electronic camera to which an automatic focusing camera and a shooting method according to the present invention are applied.

FIG. 1 is a block diagram showing an embodiment of an electronic camera 10 to which an automatic focusing (AF) camera and a shooting method according to the present invention are applied.

An optical system of the electronic camera 10 comprises a taking lens group 12 that can be focused, a diaphragm 13 that adjusts an amount of an incident light and a depth of field of the optical system, and a CCD (a solid imaging device) 14 that converts a subject image into electric signals.

The imaging signals acquired by the CCD 14 are sent to an AF estimate determining device 16. The AF estimate determining device 16 converts the imaging signals into digital R, G and B signals and then abstracts large-contrast components. The AF estimate determining device 16 also divides the subject image into focusing areas and calculates the average of contrasts in each focusing area, and outputs the average in each focusing area to a CPU 18.

The CPU 18 has a RAM that is a readable and writable recording device and a ROM that is a read-only recording device in which programs for operating the CPU 18, constants and so on are stored.

The CPU 18 is connected to a displaying device 20 that displays an image and a recording device 22 that stores image data. The CPU 18 is also connected to an AF motor 24 that focuses the lens group 12 and a diaphragm motor 26 that adjusts the aperture of the diaphragm 13. The AF motor 24 and the diaphragm motor 26 operates in accordance with instructions of the CPU 18 (a shooting device), and the CPU 18 automatically performs shooting when the lens group 12 is at a position for focusing on each subject. The distance between the lens group 12 and an imaging surface of the CCD 14 and the aperture of the diaphragm 13 can be determined, and the distance and the aperture are inputted to the CPU 18.

The CPU 18 has a TTLAE function for abstracting brightness components from the digital signals, acquiring a brightness level of the subject by integrating the brightness components in a predetermined focusing area and so on, and determines an exposure (an f-number and a shutter speed) required for the shooting from the brightness level. The electronic camera 10 is provided with a shutter release button that instructs the CPU 18 to perform the AF and the automatic exposure (AE) when it is half pushed and that instructs the CPU 18 to perform a shooting when it is fully pushed. The lens group 12 is moved to be focused in the above explanation, but the present invention is not limited to this, and the imaging surface may be moved.

The AF method of the electronic camera 10 constructed as described above will now be explained.

At first, the lens group 12 is at a position for an infinity shooting. The subject image is formed on the imaging surface of the CCD 14 through the lens group 12, and the subject image is converted into signal electric charges corresponding to the amounts of the incident lights by sensors of the CCD 14. The signal electric charges are sent to the AF estimate determining device 16, which converts the R, G and B signals of each pixel into the digital R, G and B signals and calculates an AF estimate for determining a subject distance for automatic focusing by a high-frequency component abstracting circuit.

The AF estimate determining device 16 abstracts high-frequency components whose contrasts (differences between adjoining pixels) are large in each of the 8-by-8 focusing areas into which the subject image is divided. The AF estimate determining device 16 also calculates the average of the contrasts in each focusing area, and outputs the average in each focusing area to the CPU 18. To perform the AE, the CPU 18 acquires the brightness level of the subject in the image from the digital signals and determines the aperture of the diaphragm 13 and stores the depth of field corresponding to the aperture. If the aperture has been determined by the user, the CPU 18 reads the aperture from the diaphragm motor 26 and stores the aperture and the depth of field corresponding to the aperture.

The subject distance is changed from the infinity to the shortest distance, and the AF estimate determining device 16 finds AF estimates at subject distances. After the AF estimate $\Sigma A1$ when the subject distance is the infinity (the first point) is determined, the CPU 18 instructs the AF motor 24 to shorten the subject distance by one step. If the one step is set at the depth of field that changes according to the aperture of the diaphragm 13, the number of the subject distances is small and the AF can be quickly performed.

Then, the AF estimates $\Sigma A2, \Sigma A3, \Sigma A4, \ldots$ are found in this order in the same way as the AF estimate $\Sigma A1$. The subject distance of the maximum among the AF estimates $\Sigma A1-\Sigma A13$ is found, and the found subject distance is regarded as the subject distance for automatic focusing. Then, the lens group 12 is moved according to the subject distance for automatic focusing, and the shooting is performed. If the curved line connecting points of the AF estimates has a plurality of inflection points, only the subject distances of the local maximums may be regarded as the subject distances for automatic focusing.

If there are a plurality of subject distances for automatic focusing, the shooting may be performed when the lens group 12 is at a position corresponding to each subject distance for automatic focusing, and the data of the images may be stored in the recording device 22. If the background is far from the camera and main subjects are near to the camera, the shooting does not have to be performed when the lens group 12 is at the position for focusing on the background. Generally, if the contrast detecting method is used for backgrounds whose contrasts are small such as a sky, a sea and a wall, the AF estimate is low.

If there are a plurality of subject distances for automatic focusing, the difference between the longest distance and the shortest distance among the subject distances for automatic focusing is found, and the difference is compared with the depth of field corresponding to the stored aperture. If the depth of field is larger than the difference, the shooting may be performed according to a new subject distance for automatic focusing that is the average of the subject distances for automatic focusing.

If the depth of field is smaller than the difference, it is determined whether or not an f-number corresponding to a depth of field covering the subject distances for automatic focusing can be acquired. If yes, the CPU 18 calculates the f-number and instructs the diaphragm motor 26 to set the diaphragm 13 to the f-number. Then, the CPU 18 calculates the new subject distance for automatic focusing that is the average of the subject distances for automatic focusing, and the shooting is performed according to the new subject distance for automatic focusing.

If the f-number corresponding to the depth of field covering the subject distances for automatic focusing is too large and can not be acquired, the CPU 18 selects subject distances for automatic focusing within the depth of field corresponding to the f-number. Then, the CPU 18 calculates the new subject distance for automatic focusing that is the average of the subject distances for automatic focusing, and the shooting is performed according to the new subject distance for automatic focusing. The difference between the longest distance and the shortest distance among the subject distances for automatic focusing is compared with the depth of field. If the depth of field is larger than the difference, a new subject distance for automatic focusing that is the average of the subject distances for automatic focusing is determined.

If the diaphragm 13 is closed down too much to widen the depth of field, the shutter speed (or the accumulation time of the electric charges) is long and the camera easily shakes at the shooting. Thus, a threshold of the f-number is set according to the focal length of the taking lens, and the aperture is adjusted in such a manner that the f-number is not more than the threshold anytime except when a special shooting is performed.

In this case, if the background is far from the camera and main subjects are near to the camera and all the subject distances for automatic focusing are not within the depth of field corresponding to the f-number, the shooting does not have to be performed according to the subject distance for focusing on the background.

If the electronic camera 10 can rewrite image data, the image data obtained at the shootings with the subject distances for automatic focusing is temporarily stored and then the images are displayed and only desired images are selected to be stored in the recording device 22.

Figure 2:
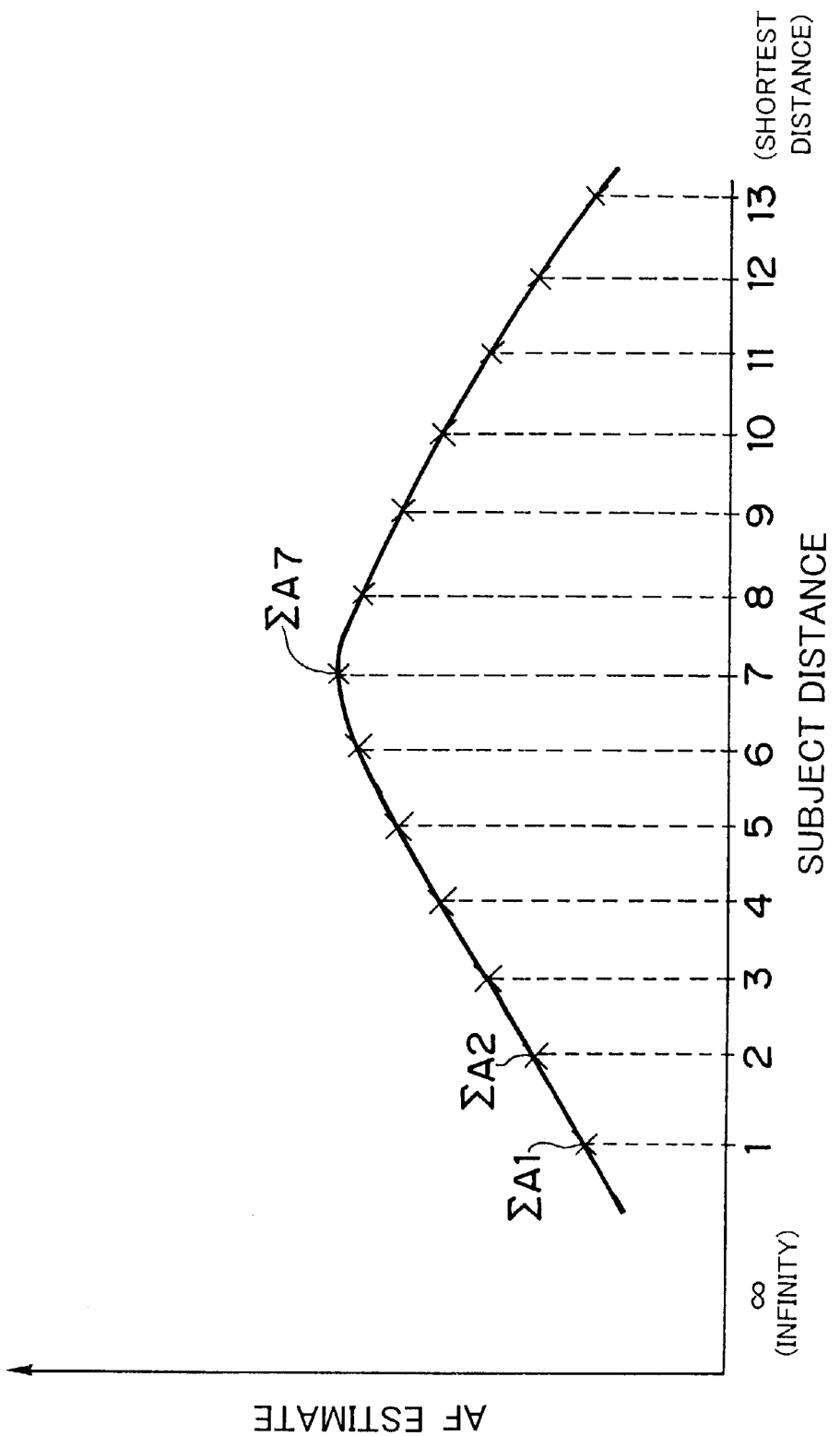
FIG. 2 is a graph diagram showing AF estimates.

FIG. 2 is a graph diagram showing the method of determining the subject distance for automatic focusing.

FIG. 2 shows the AF estimates for a subject image when the distance between main subjects and the camera is the seventh subject distance. The maximum among the AF estimates $\Sigma An$ (n=1, 2, 3, ..., 13) is the AF estimate $\Sigma A7$. The CPU 18 regards the seventh subject distance as the subject distance for automatic focusing since the AF estimate $\Sigma A7$ is the maximum and a local maximum.

If the CPU 18 determines that the curved line connecting the points in the vicinity of the maximum point is gentle, the CPU 18 may instruct the diaphragm motor 26 to close down the aperture. When the differences of the distances between the subjects and the camera are large, the depth of field can be automatically widened. If the curved line is steep, the shooting is performed with the f-number found by the AE.

Figure 3:
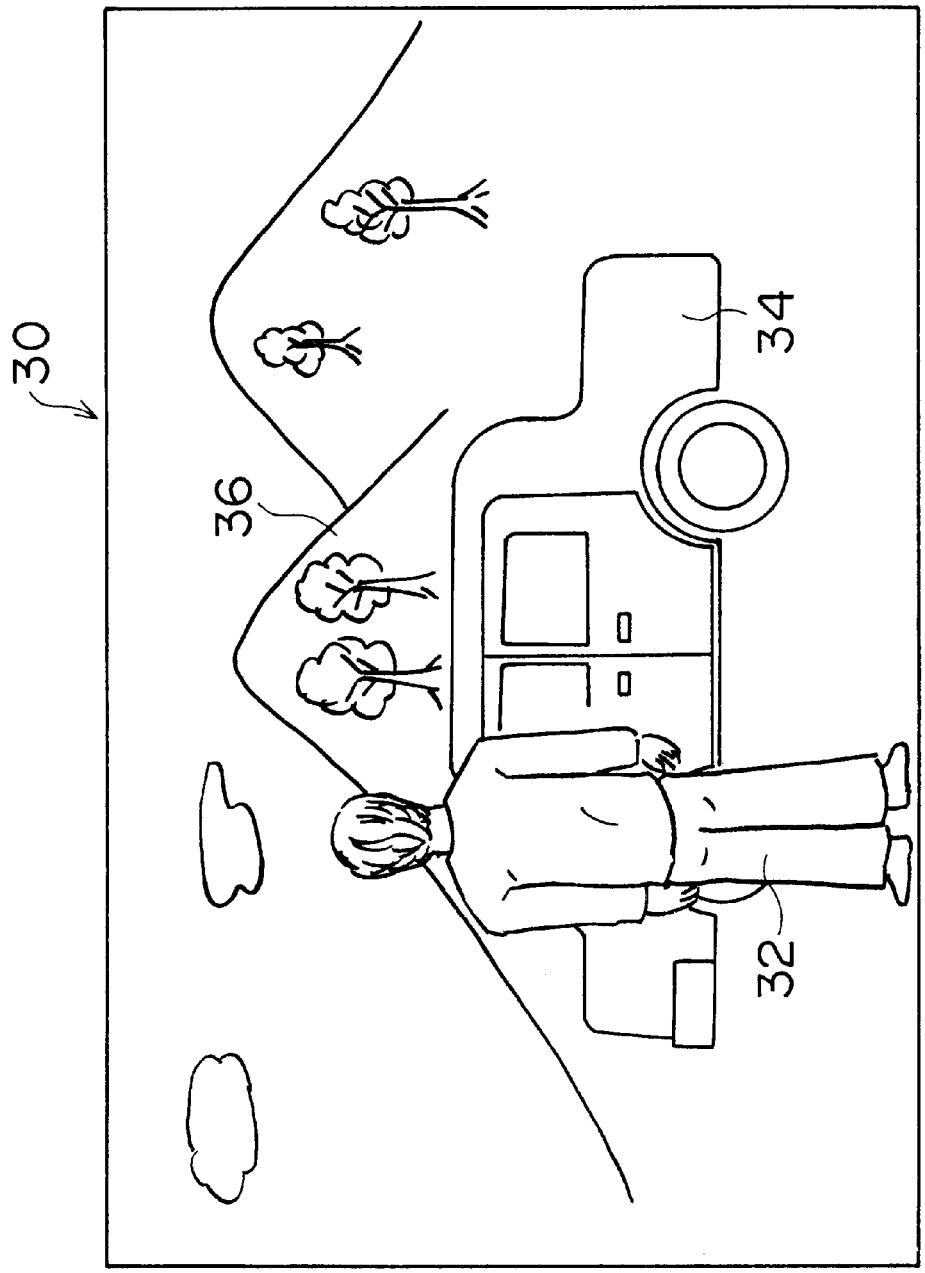
FIG. 3 is a diagram showing a subject image in which distances between subjects and the camera are different.

FIG. 3 shows a subject image 30 in which the distances between subjects and the camera are different.

Figure 4:
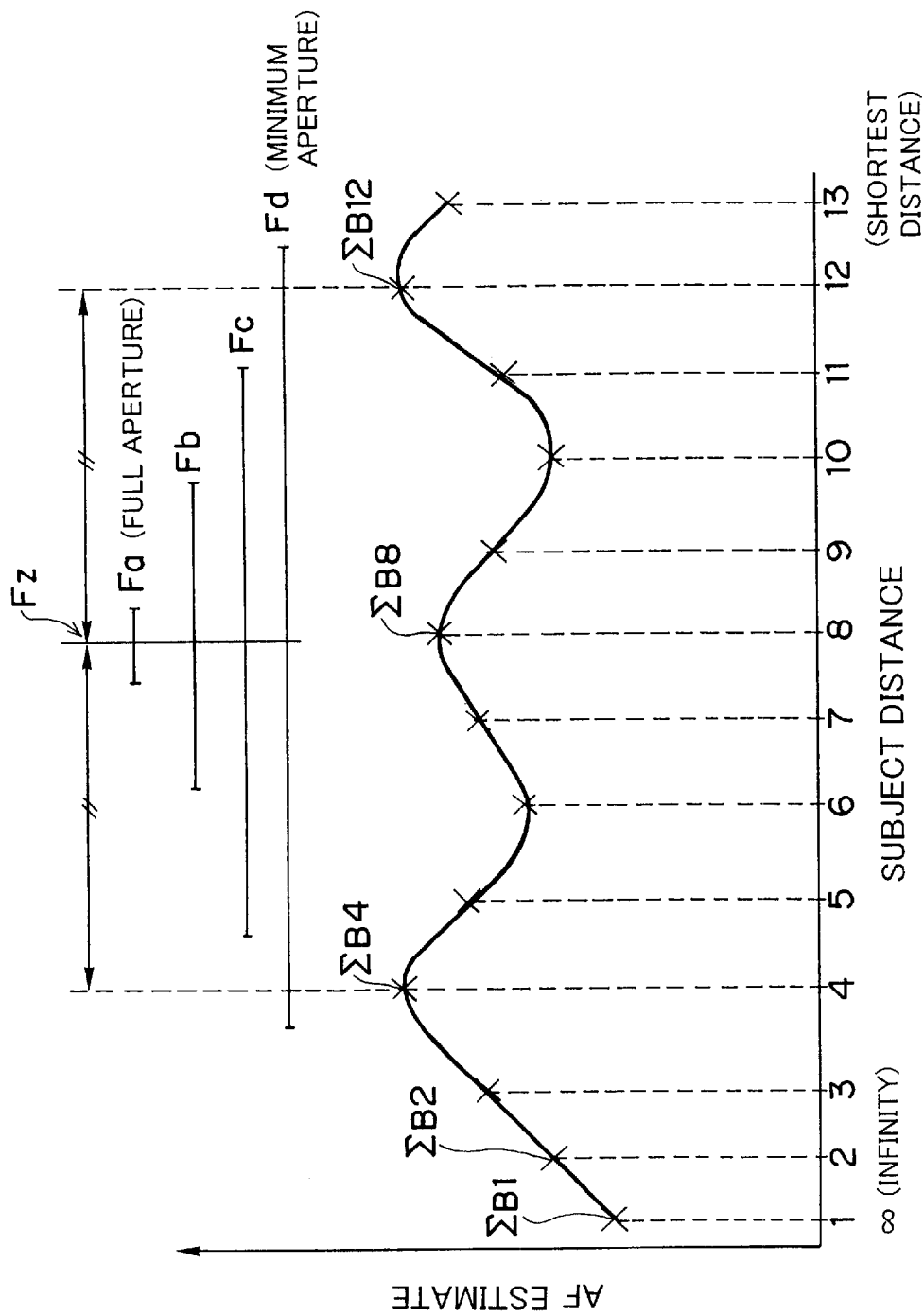
FIG. 4 is a graph diagram showing the AF estimates for the subject image in which the distances between the subjects and the camera are different.

As shown in FIG. 3, in the subject image 30, there is a person 32 that is close to the electronic camera 10, a car 34 that is farther than the person 32 and a background 36 that is far from the electronic camera 10. FIG. 4 shows AF estimates at the subject distances for the subject image in FIG. 3.

As shown in FIG. 4, the points of the AF estimate $\Sigma B4$ at the fourth subject distance for focusing on the background 36, the AF estimate $\Sigma B8$ at the eighth subject distance for focusing on the car 34 and the AF estimate $\Sigma B12$ at the twelfth subject distance for focusing on the person 32 are local maximums. The CPU 18 regards the fourth, eighth and twelfth subject distances as the subject distances for automatic focusing, and performs the shootings according to the subject distances for automatic focusing.

Then, the difference between the longest distance and the shortest distance among the subject distances for automatic focusing is compared with the depth of field corresponding to the stored f-number (such as Fa, Fb, Fc and Fd). If the depth of field is larger than the difference, the shooting may be performed according to a new subject distance for automatic focusing that is the average of the subject distances for automatic focusing.

Figure 5:
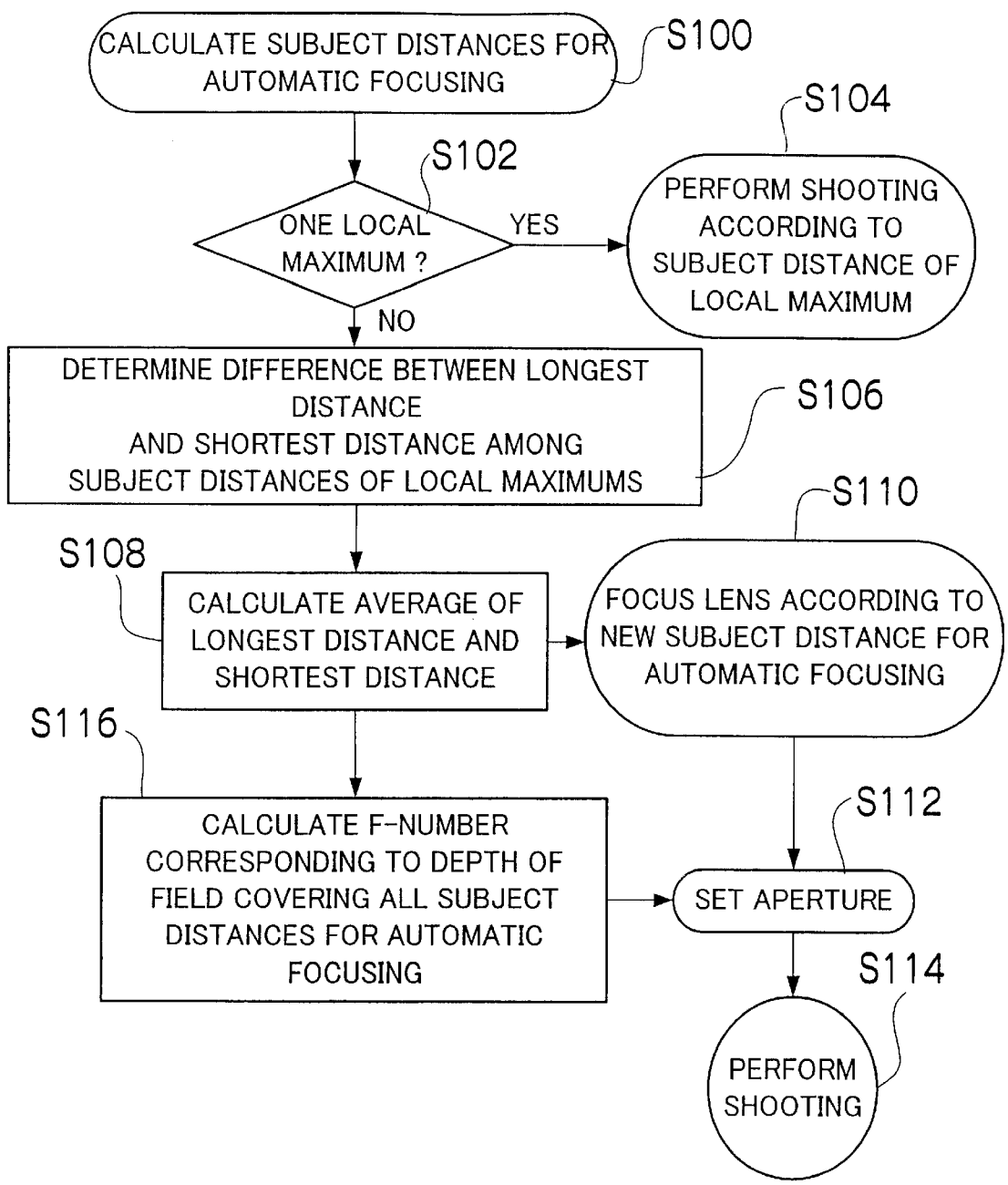
FIG. 5 is a flowchart showing a method of finding subject distances for automatic focusing.

FIG. 5 is a flowchart showing the method of finding the subject distances for automatic focusing.

After the AF estimates at the subject distances are found, the subroutine of the step 100 of "CALCULATE SUBJECT DISTANCES FOR AUTOMATIC FOCUSING" starts. Then, the processing goes to the step 102 of "ONE LOCAL MAXIMUM?."

At the step 102, it is determined whether or not the curved line connecting the points of the AF estimates has one local maximum (whether the curved line does not have a plurality of local maximums). If the curved line has one local maximum, the processing goes to the step 104 of "PERFORM SHOOTING ACCORDING TO SUBJECT DISTANCE OF LOCAL MAXIMUM," and the shooting is performed according to the subject distance of the local maximum. If the curved line has two or more local maximums, the processing goes to the step 106 of "DETERMINE DIFFERENCE BETWEEN LONGEST DISTANCE AND SHORTEST DISTANCE AMONG SUBJECT DISTANCES OF LOCAL MAXIMUMS."

At the step 106, the difference between the longest distance and the shortest distance among the subject distances of the local maximums is determined. In FIG. 4, the difference between the fourth subject distance and the twelfth distance is determined.

At the step 108 of "CALCULATE AVERAGE OF LONGEST DISTANCE AND SHORTEST DISTANCE," the average of the longest distance and the shortest distance is calculated as the new subject distance for automatic focusing. In FIG. 4, the average FZ of the fourth subject distance and the twelfth distance is calculated. If all the subject distances for automatic focusing are within the depth of field corresponding to the f-number (for example, Fd in FIG. 4) found by the AE, the processing goes to the step 110 of "FOCUS LENS ACCORDING TO NEW SUBJECT DISTANCE FOR AUTOMATIC FOCUSING."

At the step 110, the AF motor 24 is controlled to focus the lens according to the new subject distance FZ for automatic focusing. At the step 112 of "SET APERTURE," the diaphragm motor 26 is driven to set the aperture for the f-number found by the AE.

After the setting of the aperture, at the step 114 of "PERFORM SHOOTING," the shooting is performed and the image data is stored in the recording device 22.

If all the subject distances for automatic focusing are not within the depth of field corresponding to the f-number (for example, Fa, Fb or Fc in FIG. 4) found by the AE, the processing goes to the step 116 of "CALCULATE F-NUMBER CORRESPONDING TO DEPTH OF FIELD COVERING ALL SUBJECT DISTANCES FOR AUTOMATIC FOCUSING."

At the step 116, the f-number (Fd in FIG. 4) corresponding to the depth of field covering all the subject distances for automatic focusing is found, and then the processing goes to the step 112 and the step 114, where the shooting is performed.

FIG. 6 is a timing chart showing the shooting method according to the present invention. In this case, not all the subject distances for automatic focusing are within the depth of field, and the shootings are performed according to the three subject distances for automatic focusing.

As shown in FIG. 6, when the shutter release button of the electronic camera 10 is half pushed at the time t1, the calculation of the AF estimates is started. The AF estimates are calculated while the subject distance is changed from the first step to the thirteenth step in order. Then, the subject distances for automatic focusing are found between the times t10 and t11, and the subject distance is changed to the twelfth subject distance so that the camera is ready for the shooting. At this time, if the subject distance is changed from the shortest-distance side that is opposite from the infinity side from which the subject distance is changed while the AF estimates are calculated, the driving system for the lens group causes a hysteresis in which the subject distance is changed to a distance that is different from the twelfth subject distance under the influence of friction or backlash. To address this program, the subject distance is temporarily changed toward the infinity side of the twelfth subject distance and then changed toward the shortest-distance side to the twelfth subject distance. If the AF driving system never causes the hysteresis, the subject distance may be changed from either side.

When the shutter release button of the electronic camera 10 is fully pushed, the shooting is performed according to the twelfth subject distance. Likewise, the subject distance is changed to the eighth subject distance and the shooting is performed according to the eighth subject distance, and the subject distance is changed to the fourth subject distance and the shooting is performed according to the fourth subject distance. If the shutter release button is half and fully pushed sequentially, the processing is sequentially performed from the time t1 to the time t17.

The above processing takes a long time since the subject distance is changed toward the infinity side and the shortest-distance side for eliminating the hysteresis. To reduce the shooting time, in a "BRACKET MODE" for sequentially performing shootings according to a plurality of subject distances for automatic focusing, as shown in FIG. 7, the subject distance may be changed to a distance that is longer than all the subject distances for automatic focusing before the shootings are performed.

In the embodiment the automatic focusing camera uses the contrast detecting method in which the subject distances for automatic focusing are found from the image data outputted from the CCD 14, but the present invention is not limited to this, and it may use another focusing method such as the triangulation method, the external-light passive method, the light active method and the sonar focusing. Also, the present invention can be applied to not only the electronic camera but also a silver halide camera.

As set forth hereinabove, according to the present invention, the automatic focusing camera comprises the determining device that determines the positions of the focus lens or the imaging surface for focusing on the subjects in the subject image, the focus adjusting device that sequentially moves the focus lens or the imaging surface to the positions determined by the determining device, and the shooting device that performs the shootings when the focus lens or the imaging surface is at the positions. Therefore, the user can focus the camera on the intended subjects even if there are subjects with different subject distances.

As set forth hereinabove, according to the present invention, the automatic focusing camera comprises the determining device that determines the positions of the focus lens or the imaging surface for focusing on the subjects in the subject image, the focus adjusting device that moves the focus lens or the imaging surface to the position that is substantially halfway between both ends of the positions determined by the determining device, the aperture adjusting device that adjusts the aperture so that the subjects are within the depth of field when the subjects are imaged with the focus lens or the imaging surface moved by the focus adjusting device, and the shooting device that performs the shooting with the focus lens or the imaging surface moved by the focus adjusting device and the aperture adjusted by the aperture adjusting device. Therefore, the user can focus the camera on the intended subject even if there are subjects with different subject distances.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An automatic focusing camera, comprising:
   a determining device that determines a plurality of positions of a focus lens or an imaging surface for focusing on a plurality of subjects in a subject image, the determining device determining the positions by at least calculating automatic focusing (AF) estimates for a plurality of different subject distances within a range of subject distances;
   a focus adjusting device that sequentially moves the focus lens or the imaging surface to each of the positions determined by the determining device; and
   a shooting device that performs shootings when the focus lens or the imaging surface is at each of the positions, wherein the determining device moves the focus lens or the imaging surface along an optical axis, calculates the AF estimates at the plurality of subject distances by abstracting high-frequency components whose contrasts are large from signals outputted from the shooting device when the focus lens or the imaging surface is at each of the positions and determines at least one position of the focus lens or the imaging surface at which the AF estimate is a local maximum.

2. An automatic focusing camera, comprising:
   a determining device that determines a plurality of positions of a focus lens or an imaging surface for focusing on a plurality of subjects in a subject image, the determining device determining the positions by at least calculating automatic focusing (AF) estimates for a plurality of different subject distances within a range of subject distance;
   a focus adjusting device that moves the focus lens or the imaging surface to a position that is substantially halfway between both extreme ends of the positions determined by the determining device;
   an aperture adjusting device that adjusts an aperture so that the subjects are within a depth of field when the subjects are imaged with the focus lens or the imaging surface that are moved by the focus adjusting device; and
   a shooting device that performs a shooting with the focus lens or the imaging surface that are moved by the focus adjusting device and the aperture adjusted by the aperture adjusting device, wherein the determining device moves the focus lens or the imaging surface along an optical axis, calculates the AF estimates at the plurality of subject distances by abstracting high-frequency components whose contrasts are large from signals outputted from the shooting device when the focus lens or the imaging surface is at each of the positions and determines at least one position of the focus lens or the imaging surface at which the AF estimate is a local maximum.

3. The automatic focusing camera as defined in claim 2, wherein the aperture adjusting device finds an f-number corresponding to a depth of field covering the subject distances so that the subjects are within the depth of field according to both extreme ends of the positions of the focus lens or the imaging surface determined by the determining device and sets the aperture for the f-number.

4. The automatic focusing camera as defined in claim 2, wherein the aperture adjusting device finds an f-number corresponding to a depth of field covering the subject distances so that the subjects are within the depth of field according to subject distances corresponding to both extreme ends of the positions of the focus lens or the imaging surface determined by the determining device and sets the aperture for the f-number.

5. A shooting method, comprising the steps of:

determining a plurality of positions of a focus lens or an imaging surface for focusing on a plurality of subjects in a subject image, the determining step determining the positions by at least calculating automatic focusing (AF) estimates for a plurality of different subject distances within a range of subject distances;

sequentially moving the focus lens or the imaging surface to each of the determined positions; and performing shootings when the focus lens or the imaging surface is at each of the positions, wherein the position determining step comprises the steps of:

moving the focus lens or the imaging surface along an optical axis;

calculating the AF estimates at the plurality of subject distances in such a way that high-frequency components whose contrasts are large are abstracted from outputted signals when the focus lens or the imaging surface is at each of the positions; and determining the positions according to at least one position of the focus lens or the imaging surface at which the AF estimate is a local maximum.

6. A shooting method, comprising the steps of:

determining a plurality of positions of a focus lens or an imaging surface for focusing on a plurality of subjects in a subject image, the determining step determining the positions by at least calculating automatic focusing (AF) estimates for a plurality of different subject distances within a range of subject distances;

moving the focus lens or the imaging surface to a position that is substantially halfway between both extreme ends of the determined positions;

adjusting an aperture so that the subjects are within a depth of field when the subjects are imaged with the moved focus lens or the moved imaging surface; and performing a shooting with the moved focus lens or the moved imaging surface and the adjusted aperture, wherein the position determining step comprises the steps of:

moving the focus lens or the imaging surface along an optical axis;

calculating the AF estimates at the plurality of subject distances in such a way that high-frequency components whose contrasts are large are abstracted from outputted signals when the focus lens or the imaging surface is at each of the positions; and determining the positions according to at least one position of the focus lens or the imaging surface at which the AF estimate is a local maximum.

7. The shooting method as defined in claim 6, wherein the aperture adjusting step comprises the steps of:

finding an f-number corresponding to a depth of field covering the subject distances so that the subjects are within the depth of field according to both extreme ends of the determined positions of the focus lens or the imaging surface; and setting the aperture for the f-number.

8. The shooting method as defined in claim 6, wherein the aperture adjusting step comprises the steps of:

finding an f-number corresponding to a depth of field covering the subject distances so that the subjects are within the depth of field according to subject distances corresponding to both extreme ends of the determined positions of the focus lens or the imaging surface; and setting the aperture for the f-number.

9. An automatic focusing camera, comprising:

a determining device that determines a plurality of positions of a focus lens or an imaging surface for focusing on a plurality of subjects in a subject image, the determining device determining the positions by at least calculating automatic focusing (AF) estimates for a plurality of different subject distances within a range of subject distances;

a focus adjusting device that either moves the focus lens or the imaging surface to a position that is substantially halfway between both extreme ends of the positions determined by the determining device or sequentially moves the focus lens or the imaging surface to each of the positions determined by the determining device;

an aperture adjusting device that adjusts an aperture so that the subjects are within a depth of field when the subjects are imaged with the focus lens or the imaging surface that are moved by the focus adjusting device;

a depth determination device that determines whether or not a plurality of subjects can be adjusted to be in the depth of field by the aperture adjusting device; and a shooting device that performs a shooting with the focus lens or the imaging surface that are moved by the focus adjusting device and the aperture adjusted by the aperture adjusting device if the depth determination device determines that the plurality of subjects can be adjusted to be in a depth of field, the shooting device performs shootings when the focus lens or the imaging surface is at each of the positions if the depth determination device determines that the plurality of subjects cannot be adjusted to be in a depth of field, wherein the determining device moves the focus lens or the imaging surface along an optical axis, calculates the AF estimates at the plurality of subject distances by abstracting high-frequency components whose contrasts are large from signals outputted from the shooting device when the focus lens or the imaging surface is at each of the positions and determines at least one position of the focus lens or the imaging surface at which the AF estimate is a local maximum.

* * * * *